United States Patent
Fukui

[11] Patent Number: 5,499,823
[45] Date of Patent: Mar. 19, 1996

[54] GROMMET WITH FILLER INLET OPENING

[75] Inventor: Takaaki Fukui, Yokkaichi, Japan

[73] Assignee: Sumitomo Wiring Systems, Ltd., Japan

[21] Appl. No.: 331,203

[22] Filed: Oct. 28, 1994

[30] Foreign Application Priority Data

Feb. 17, 1994 [JP] Japan ..................... 6-020358

[51] Int. Cl.$^6$ ............... H01B 17/30; H02G 3/22
[52] U.S. Cl. .............. 277/1; 277/72 FM; 277/178; 174/153 G; 174/152 G; 16/2; 248/56
[58] Field of Search ............... 277/1, 72 FM, 277/178, 212 FB; 174/65 G, 152 G, 153 G; 248/56; 222/460; 52/220.1, 220.8; 16/2; 285/284, 915

[56] References Cited

U.S. PATENT DOCUMENTS

| | | | |
|---|---|---|---|
| 1,384,565 | 7/1921 | Martin | 16/2 |
| 1,925,541 | 9/1933 | Noble | 222/460 |
| 3,997,760 | 12/1976 | Sainger | 174/153 G |
| 4,018,500 | 4/1977 | Hamacher | 16/2 |
| 4,797,513 | 1/1989 | Ono et al. | 277/178 |
| 4,912,287 | 3/1990 | Ono et al. | 277/178 |
| 4,959,509 | 9/1990 | Takeuchi et al. | 174/153 G |
| 5,270,487 | 12/1993 | Sawamura | 174/152 G |
| 5,297,596 | 3/1994 | Anson | 222/460 |

FOREIGN PATENT DOCUMENTS

| 2327 | 8/1988 | Japan. | |
|---|---|---|---|
| 262532 | 12/1926 | United Kingdom | 277/178 |

Primary Examiner—Scott W. Cummings
Attorney, Agent, or Firm—Jordan B. Bierman; Bierman and Muserlian

[57] ABSTRACT

A grommet including a hollow shell, a hollow retaining section, and a hollow member, the shell having a shell opening at a first end and a reduced diameter opening at a second end, and in communication with the retaining section at the second end. There is an insertion hole and a member wall, extending from said insertion hole in a direction away from the first end and toward the second end, which terminates at the inner wall of the shell. The member is in communication with said retaining section. A filler opening is provided in the member wall, and filler walls extend from the member and form a filler inlet in communication with the filler opening. The filler inlet can receive the filler which flows through the filler opening into the member and surrounds at least one elongated, generally cylindrical object located within the member and the retaining section.

19 Claims, 3 Drawing Sheets

GROMMET WITH FILLER INLET OPENING

This Application claims the benefit of the priority of Japanese Application 6/20358, filed Feb. 17, 1994.

The present invention is directed to a grommet for sealing an elongated, generally cylindrical object in a panel. More specifically, it is intended to provide a means whereby a bundle of wires can be sealably inserted into the dashboard or chassis of an automobile, but is not limited to this specific use. In addition, a method of sealing the wires within the grommet is also disclosed.

BACKGROUND OF THE INVENTION

In a wiring harness as used in vehicles, it is frequently desirable to insert a portion of the harness through a hole in the chassis or other portions of the vehicle. In the past, the appropriate portion of the wire harness was inserted into a flexible grommet (frequently of rubber) and the grommet was, in turn, inserted into a hole provided therefor. However, gaps were sometimes formed between the harness and the grommet, as well as in the interstices between the various wires making up the bundle. Thus, in order to waterproof the connection, a filler was applied to the spaces between the bundle of wires and the inner surface of the grommet. The filler was also introduced into the spaces between the individual wires making up the bundle.

A typical prior art grommet of this general type is described in Japanese Utility Model OPI 2327/88 and in FIG. 6 hereof. Panel 2 represents a member through which bundle 3 of wires 3a is to pass in waterproof fashion. Through-hole 2a is first provided in panel 2. Base 1b of grommet 1 is inserted therethrough and groove 1a receives the edge of hole 2a. Side wall 5 defines tube portion 1d and wire insert portion 1c. The filler is introduced through filler hole 1e and flows into tube portion 1d and wire insert portion 1c. Seal 4 is wrapped around the outside of a portion of bundle 3 and side wall 5 to retain bundle 3 in position.

This device provides only a small filler hole 1e so that, when filler is forced therein, there is a great tendency for it to spill outside tube 1d. Furthermore, filler hole 1e is provided for only a comparatively short distance along tube portion 1d; thus, if the fluidity of the filler is not good, it will not easily or completely permeate the gap between bundle 3 and the inner surface of tube 1d, nor will it fill the interstices between wires 3a of bundle 3. Thus, introduction of filler is difficult and requires considerable care in order to insure that the filler completely seals the gap between bundle 3 and tube portion 1d, as well as thoroughly permeating the interstices between wires 3a.

SUMMARY OF THE INVENTION

Therefore, it is among the objects of the present invention to provide a grommet which will render introduction of the filler easy and non-critical. It is also among the objects of the present invention to improve the accuracy of filling and the integrity of the seal which results therefrom. The present invention will be described in connection with the installation of a bundle of electrical wires in a panel or chassis such as is found in automobiles. However, as a person of ordinary skill will readily recognize, its application is by no means limited thereto.

A grommet is provided which comprises a hollow shell, a hollow wire retaining section, and a hollow internal member. The shell has a shell opening at a first end and a reduced diameter opening at the second end. The hollow member, preferably located entirely within the shell, has an insertion hole and a member wall extending from the insertion hole in the direction away from the first end and toward the second end. The member wall terminates at the inner wall of the shell, preferably adjacent the second end. Thus, the member communicates with the retaining section.

The member wall contains a filler opening extending therethrough and there are filler walls projecting from the member wall (on either side of the filler opening) and preferably terminating at the inner wall of the shell. The filler walls and the shell form a filler inlet which is in communication with the filler opening.

In use, the filler is introduced into the filler inlet from which it flows through the filler opening into the internal portion of the member. From there, it enters the retaining section, thereby filling any space between the inner wall of that section and the exterior of the bundle, as well as permeating the interstices between the individual wires thereof. Thus, a good waterproof seal is formed.

The filler opening is advantageously in the form of a slot which extends substantially from the insertion hole to a point adjacent the inner wall of the shell. It is also desirable that both the retaining section and the insertion hole are of such dimensions that the bundle of wires is firmly held thereby. It is also preferable that the member be generally of conical shape, the member wall flaring outwardly in the direction away from the first end and toward the second end, thereby defining a hollow cone.

In another embodiment of the present invention, the filler walls are joined at their extremities, thereby forming a filler tube. In this modification, the filler is inserted into the tube, which preferably tapers toward the second end, and flows through the filler opening. By providing a filler tube, rather than the inlet of the first embodiment, a portion of the hollow shell can act as an overflow basin should any of the filler spill. In a particularly preferred form of the invention, the various elements thereof are molded integrally for ease and economy of manufacture. Moreover, such construction would minimize the possibility of any leaks occurring.

BRIEF DESCRIPTION OF THE DRAWINGS

In the accompanying drawings, constituting a part hereof, in which like reference characters indicate like parts.

DETAILED DESCRIPTION OF THE INVENTION

Figure 1:
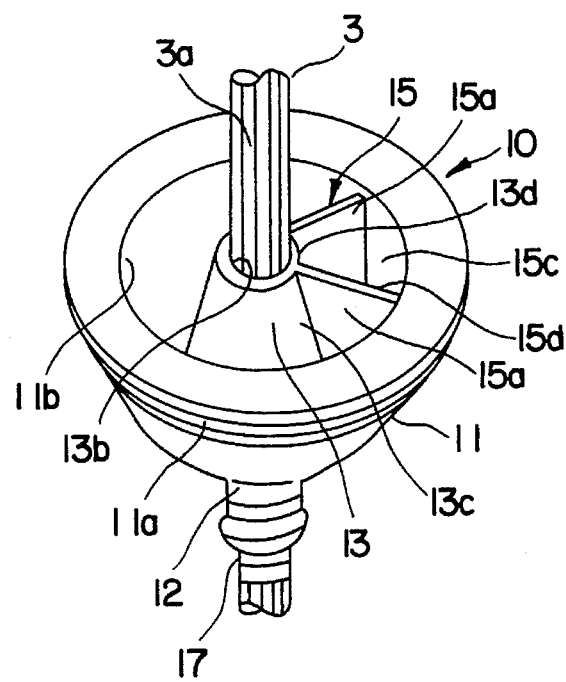
FIG. 1 is a perspective view of the first embodiment of the present invention.
Figure 2A:
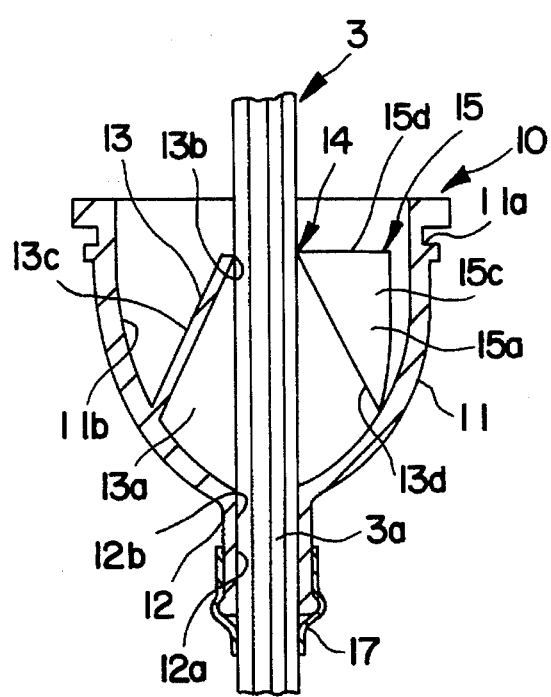
FIG. 2(A) is a cross section through the center of FIG. 1.
Figure 2B:
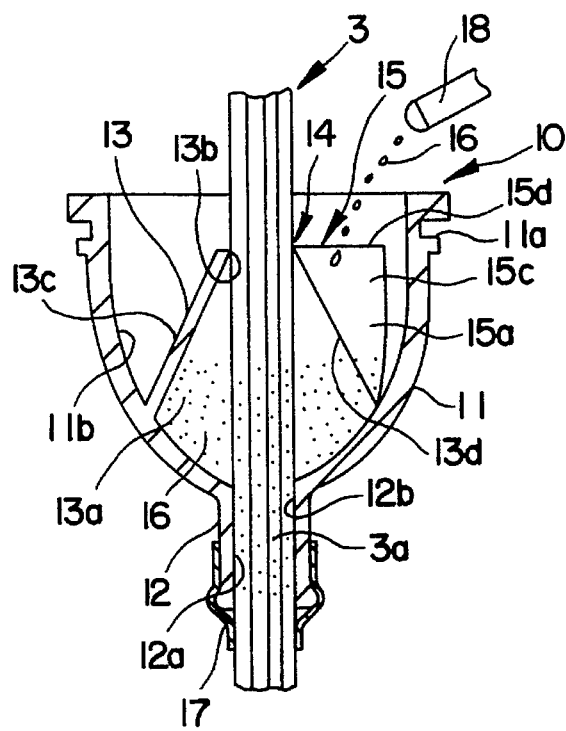
FIG. 2(B) is a view similar to that of FIG. 2(A) after the filler has been introduced.
Figure 3A:
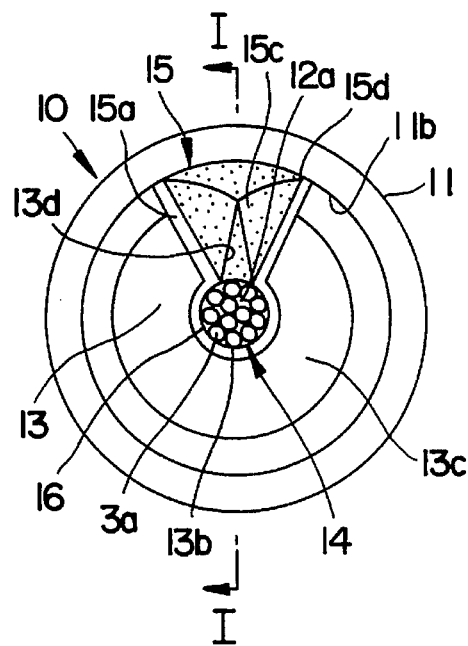
FIG. 3(A) is a plan view of the grommet of FIG. 1 after the filler has been introduced.
Figure 3B:
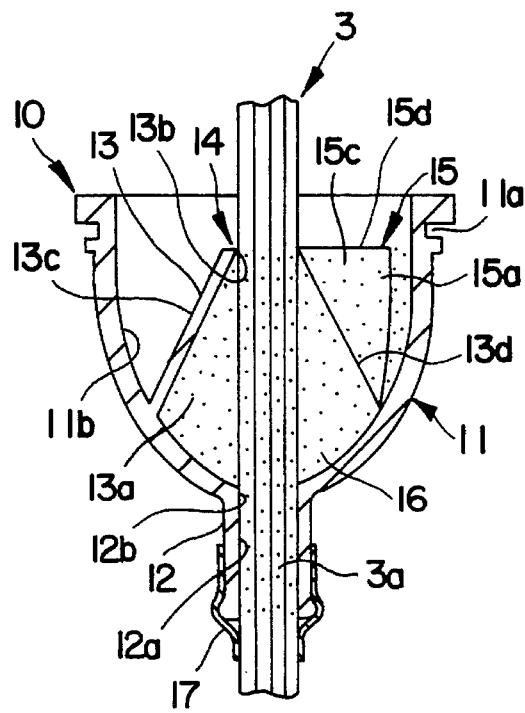
FIG. 3(B) is a section along line I—I of FIG. 3(A)

The preferred form of the first embodiment of the present invention is shown in FIGS. 1 to 3. Grommet 10 is formed of elastic material such as rubber, most suitably with all of the various components thereof integrally molded at the same time. It comprises shell 11 carrying groove 11a which receives a portion of panel 2 when the grommet is inserted into through-hole 2a (see FIG. 6). Shell opening 11b, of comparatively wide diameter, is located at the first end of grommet 10. Retaining section 12, including hollow portion 12b and constriction 12a, is at the second end of shell 11 and grips bundle 3 of wires 3a. Cone 13 is provided with relatively small insertion hole 14, having restricted diameter 13b, and cone wall 13c extends to meet the inner surface of shell 11. Cone wall 13c has filler walls 15a extending radially outwardly and terminating at the inner wall of shell 11 where they form filler port 15d. Walls 15a and shell 11 form filler inlet 15c which communicates with notch 13d, thereby permitting filler 16 to enter cone 13. Retaining section 12 is sealed to bundle 3 by tape 17.

In use, bundle 3 is inserted through insertion hole 14 and retaining section 12. Both the retaining section and the insertion hole are advantageously sized so that wire bundle 3 is firmly held thereby. This eliminates any necessity for the operator to hold bundle 3 manually and insures proper location thereof.

Thereafter, filler 16 is introduced by nozzle 18 into filler port 15d and filler inlet 15c of element 15, Filling element 15 holds filler 16 and prevents spillage as filler 16 flows through notch 13d into cone 13 and thence into retaining section 12. If necessary, filler 16 can be introduced under pressure so that it penetrates retaining section 12 thoroughly and forms a good seal. Thereafter, filler 16 may be, if desirable, cured to produce the final product.

Figure 4:
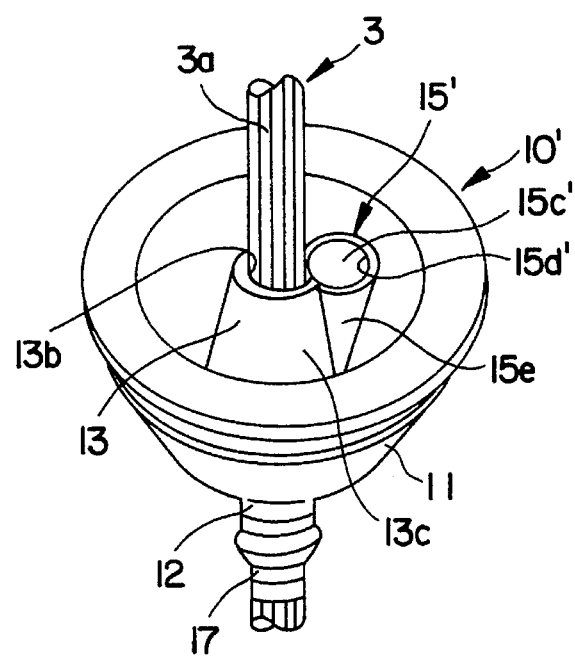
FIG. 4 is a perspective view, similar to that of FIG. 1, of the second embodiment of the present invention.
Figure 5A:
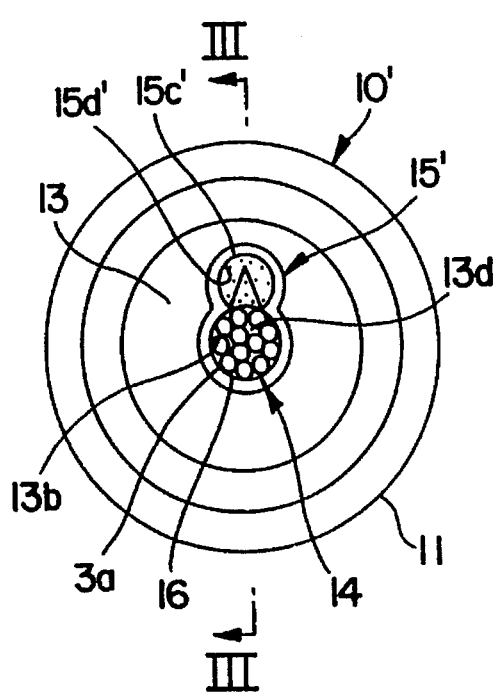
FIG. 5(A) is a view similar to that of FIG. 3(A) of the embodiment of FIG. 4.
Figure 5B:
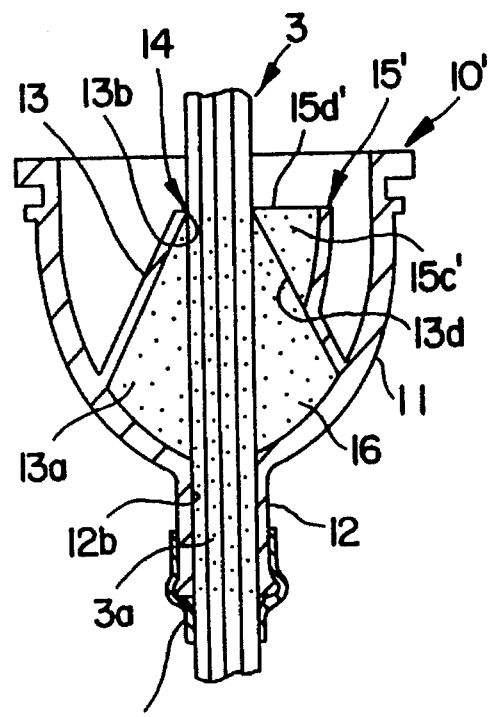
FIG. 5(B) is a view similar to that of FIG. 3(B) of the embodiment of FIG. 4.

The second embodiment of the present invention is shown in FIGS. 4 and 5. These views are similar to those of FIGS. 1 and 3. The structure is substantially the same as that of the first embodiment, except that cone 13 is provided with filler tube 15' which constitutes filler port 15d' and filler inlet 15c'; defined by filler tube wall 15e'. In this embodiment, filler tube 15' more readily permits nozzle 18 to be inserted therein. Moreover, if pressure is to be applied, filler tube 15' can temporarily seal against nozzle 18, thereby preventing filler 16 from flowing out of filler tube 15' and into shell 11. This embodiment would be particularly useful when filler 16 is somewhat viscous and must be forced into retaining section 12 and the interstices between wires 3a.

Figure 6:
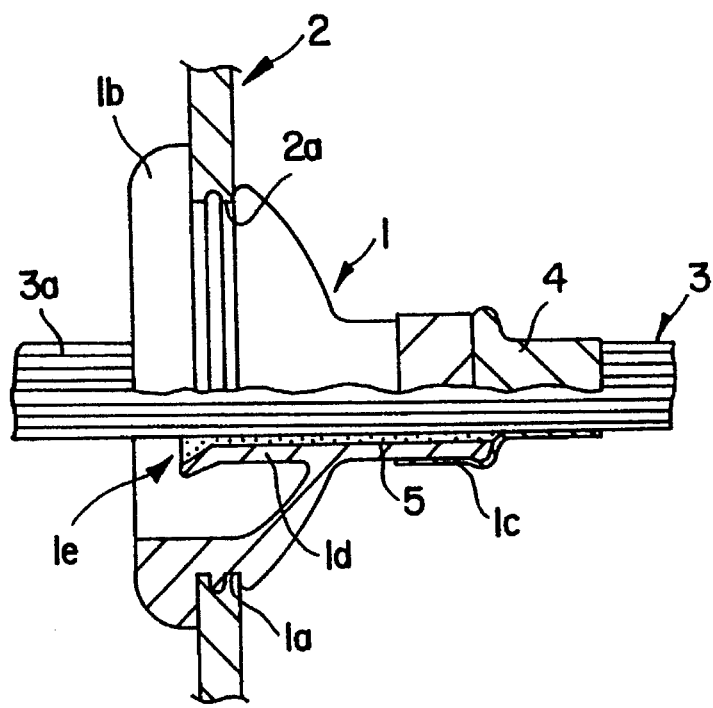
FIG. 6 is a view, partly in section and with parts broken away for clarity, of a typical prior art grommet.

The grommets according to the present invention have numerous important advantages over those of the prior art. The latter teaches introduction of the filler in the axial direction as shown in FIG. 6. The present invention, on the other hand, introduces the filler radially, so that penetration of the wire bundle is superior to that obtained with known devices. Moreover, the filler introduced in accordance with the present invention also travels axially through the interstices between the wires, and thereby provides a seal which is complete in both directions. The relatively large filler inlet of the first embodiment of the present invention minimizes the opportunity for spilling the filler. Furthermore, the interior portion of the shell will act to retain any overflow which might nonetheless occur.

Furthermore, the bundle of wires is held securely by the insertion hole, the size of which matches that of the bundle. It is unnecessary for the operator to hold the wires manually, thus eliminating a source of misalignment and reducing the time necessary to complete the assembly. The flaring shape of the cone provides an enlarged surface contacting the entrance to the retaining section and the inner wall of the shell adjacent thereto. This, too, aids in filling the gaps between the bundle and the grommet completely.

As to the second embodiment, the reduced size of the filler tube requires less filler used in sealing the assembly. It also facilitates the imposition of pressure on the filler to drive it into the gaps and interstices, should it be determined that this is desirable.

While only two specific embodiments of the present invention have been expressly described, it is, nonetheless, to be broadly construed, and not to be limited except by the character of the claims appended hereto.

What we claim is:

1. A grommet comprising a hollow shell, a hollow retaining section, and a hollow member, said shell having a shell opening at a first end and a reduced diameter opening at a second end, said hollow shell in communication with said retaining section at said second end, said member having an insertion hole and a member wall extending from said insertion hole, in a direction away from said first end and toward said second end, said member wall terminating at an inner wall of said shell, said member being in communication with said retaining section, a filler opening in said member wall, filler walls extending from said member and forming a filler inlet in communication with said filler opening, said filler inlet adapted to receive a filler which flows through said filler opening into said member and surrounds at least one elongated, generally cylindrical object located within said member and said retaining section.

2. The grommet of claim 1 wherein said retaining section and said insertion hole conform to said object.

3. The grommet of claim 1 wherein said member wall flares radially outwardly in said direction, thereby forming a hollow cone.

4. The grommet of claim 1 where a first filler wall extends from a first side of said filler opening and a second filler wall extends from a second side of said filler opening.

5. The grommet of claim 4 wherein said filler inlet is formed by said first wall, said second wall and said inner wall.

6. The grommet of claim 1 wherein said filler opening is a slot in said cone wall and extending in said direction.

7. The grommet of claim 1 wherein said object is a bundle of at least two wires, there being interstices between said wires.

8. The grommet of claim 7 wherein said filler penetrates said interstices.

9. The grommet of claim 1 wherein said first filler wall and said second filler wall terminate at said inner wall.

10. The grommet of claim 1 wherein said member is within said hollow shell.

11. The grommet of claim 1 wherein said first filler wall and said second filler wall are joined at their extremities remote from said opening, thereby forming a filler tube.

12. The grommet of claim 1 wherein said hollow shell, said hollow member, said retaining section, said first filler wall, and said second filler wall are integral.

13. The grommet of claim 1 wherein said filler inlet tapers in said direction.

14. The grommet of claim 11 wherein said filler tube tapers in said direction.

15. A sealed grommet comprising a hollow shell, a hollow retaining section, and a hollow member, said shell having a shell opening at a first end and a reduced diameter opening at a second end, said hollow shell in communication with said retaining section at said second end, said member having an insertion hole and a member wall extending from said insertion hole, in a direction away from said first end and toward said second end, said member wall terminating at an inner wall of said shell, said member in communication with said retaining section, a filler opening in said member wall, filler walls extending from said member and forming a filler inlet in communication with said filler opening, at least one elongated, generally cylindrical object in said retaining section and extending through said insertion hole and held thereby, sealant filler in said member and said retaining section.

16. The grommet of claim 15 wherein said object is a bundle of wires having interstices therebetween.

17. The grommet of claim 16 wherein said filler is in said interstices.

18. A method of sealing an object in a grommet, said grommet comprising a hollow shell, a hollow retaining section, and a hollow member, said shell having a shell opening at a first end and a reduced diameter opening at a second end, said hollow shell in communication with said retaining section at said second end, said member having an insertion hole and a member wall extending from said insertion hole, in a direction away from said first end and toward said second end, said member wall terminating at an inner wall of said shell, said member in communication with said retaining section, a filler opening in said member wall, filler walls extending from said member and forming a filler inlet in communication with said filler opening said method comprising introducing said filler into said filler opening, flowing said filler through said filler opening into said member and said retaining section to surround said object.

19. The method of claim 18 wherein said object is a plurality of wires having interstices therebetween, said method further comprising flowing said filler into said interstices.

* * * * *